United States Patent [19]

Cain et al.

[11] Patent Number: 5,046,815
[45] Date of Patent: Sep. 10, 1991

[54] OPTICAL FIBER CABLING

[75] Inventors: Michael B. Cain, Corning; Rengan Kannabiran, Big Flats; Emily M. Squires, Elmira, all of N.Y.

[73] Assignee: Corning Incorporated, Corning, N.Y.

[21] Appl. No.: 525,077

[22] Filed: May 17, 1990

[51] Int. Cl.$^5$ .............................................. G02B 6/44
[52] U.S. Cl. .................................................. 350/96.23
[58] Field of Search ................... 350/96.23, 96.3, 96.26

[56] References Cited

U.S. PATENT DOCUMENTS

| | | | |
|---|---|---|---|
| 4,691,896 | 9/1987 | Reeve et al. | 254/134.4 |
| 4,723,831 | 2/1988 | Johnson et al. | 350/96.23 |
| 4,781,433 | 11/1988 | Arroyo et al. | 350/96.23 |
| 4,796,970 | 1/1989 | Reeve et al. | 350/96.23 |
| 4,818,060 | 4/1989 | Arroyo | 350/96.23 |
| 4,881,794 | 11/1989 | Bartoszek | 350/96.23 |

FOREIGN PATENT DOCUMENTS 0157610 10/1985 European Pat. Off. .
2156837A 10/1985 United Kingdom .
2206220A 12/1988 United Kingdom .
2206420A 1/1989 United Kingdom .

OTHER PUBLICATIONS

H. G. Haag et al., "New Generation of Self-Supporting Optical Fibre Aerial Cables", *International Wire and Cable Symposium Proceedings—1989*, pp. 575–582.

Primary Examiner—Frank Gonzalez
Assistant Examiner—John Ngo
Attorney, Agent, or Firm—K. van der Sterre

[57] ABSTRACT

Plastic ducts suitable for use alone or as components of telecommunications cables to provide for easy installation of optical fibers by blow-in methods, together with optical cable designs incorporating such ducts, are described. The ducts, most preferably provided as plastic tubes, are characterized by inner sidewall compositions of a modified polyvinyl chloride (PVC)-based compound, the compound consisting at least predominantly of PVC polymer but additionally containing up to about 20% by weight of fluorocarbon polymers compounded directly with the PVC.

10 Claims, 2 Drawing Sheets

OPTICAL FIBER CABLING

BACKGROUND OF THE INVENTION

The present invention relates to cable designs for optical fiber cables, and more particularly to novel combinations of materials useful in the fabrication of such cables to facilitate the installation of optical fibers into the cables, after the cables have been installed, by the process known in the art as fiber blowing.

The terms "blow," "blown," and "blowable" as currently used in optical fiber design and optical telecommunications technology refer to optical fibers or lightweight optical fiber cables which may be installed in specially designed conduits or ducts by the effect of viscous fluid drag. The fibers or cables are sufficiently small and/or light, and the ducts sufficiently close in size to the fibers or cables, that significant forces tending to draw the fibers or cables through the ducts can be generated by forcing a gas such as air through the ducts and past the fibers or cables in the direction in which they are to be drawn.

Optical fiber transmission media utilizing blown fibers and methods for installing them are well known. U.S. Pat. No. 4,796,790 describes some optical fiber transmission media useful for installation in this manner, while published European Application EP 0157610 discloses optical fiber coating designs for fibers for blow-in installation.

Published British Patent Applications GB 2,206,420 and 2,206,220 describe still other designs for blowable optical fibers and cables. The latter patent, particularly, discloses a design for a combination coating for a blowable optical fiber or cable which comprises a soft, low modulus inner coating supporting a foamed polymer outer sheath designed to improve the blowing characteristics of the fiber or cable.

The use of a foamed or roughened outer coating on conventionally coated optical fiber or lightweight cable provides significant performance advantages for blow-in applications. Hence, such a coating significantly increases the drag forces generated by gas flow past the fiber during blow-in installation.

However, in this type of fiber as well as in other blow-in designs, another critical factor to be considered is that of the frictional interaction between the fiber or cable to be installed and the plastic tube or microduct into which installation is to be accomplished. Quite apparently, it would be desirable to minimize the friction between the fiber or cable and the duct to be used in order to decrease sidewall drag and thus increase the duct distance through which fiber may be blown.

The plastic installation tube or duct has been recognized as a critical and integral part of the blown fiber system, since it provides the pneumatic pathway through which the blown fiber must be installed. The tube material composition must thus be such that the frictional interaction between the tube and the fiber units, which may be single fibers or small fiber bundles or minicables incorporating smooth or textured plastic coatings, is minimized. The lower the frictional interaction, the longer the duct length through which the fiber can be installed.

In addition to low friction characteristics, however, it is desirable that the tube or duct material meet or exceed NEC and UL flammability requirements for in-building use. Although the tubes are normally only a part of a larger cable system, they should not contribute to or aggravate the flame or smoke characteristics of the cables in the event of fire.

The art has identified a number of different materials as useful for fabricating tubes or ducts through which fibers or small cables may be installed. One early blown fiber duct system is found in British Patent Application GB 2,156,837A. That application discloses the use of plastic ducts, formed for example of polyethylene, into which a multipurpose additive is incorporated. The multipurpose additive comprises, among other agents, one or more ingredients which function as a slip agent, as an antistatic agent, and as an antioxidant.

In the approach outlined in this patent, the slip agent used may be any organic chemical which is incompatible with the polymer forming the duct wall. Due to this incompatibility, the additive blooms onto the inner surface of the polyethylene duct, and there acts as a lubricant to reduce friction between the wall and fibers being drawn through the duct.

One disadvantage of the approach of this patent, however, is that the slip characteristics of the duct do not remain constant over the projected storage and use life of the cable. The process of blooming is difficult to control and, moreover, can result in depletion of the slip agent even before the cable is used. Thus the slip agent is subject to loss by leaching or other transport mechanism, due to moisture or other other environmental factors, both during storage and while in use.

U.S. Pat. No. 4,691,896 also discloses designs for optical fibers and optical fiber ducts useful for blow-in installation of the fibers. In that patent, polyethylene is suggested for use as a duct wall material while polyethylene or polypropylene are used for the fiber coatings.

In the cable designs shown in the patent, the duct sizes disclosed are typically below 10 millimeters in diameter, and the fiber or cable sizes are in the range of 1-4 millimeters in diameter. Ducts in this size range are sometimes referred to as ductlets or microducts in the art.

New cable designs for electrical power lines which incorporate ducts for the blow-in installation of optical fibers are described by H. G. Haag et al. in "New Generation of Self-Supporting Optical Fibre Aerial Cables," *International Wire and Cable Symposium Proceedings*-1989, pages 575–582. The ducts used in the Haag et al. cable designs are typically composed of high density polyethylene or polyamide plastics.

Although the polymers used for duct wall fabrication up to the present time can permit fiber installation over reasonable distances, further improvements in the duct materials would be highly desirable. Thus, for example, significant reductions in the coefficient of friction between the duct material and the fiber coatings currently being used could significantly increase the lengths of optical fiber which could be installed therein.

At the same time, many of the polymers proposed for use as a duct material in the prior art exhibit relatively high flammability. Cables comprising significant proportions of these polymers are expected to have difficulty meeting current flammability requirements for in-building use.

Of course, a duct composition material offering improved chemical stability in storage and use would be advantageous. This characteristic is particularly important where cables are installed with empty ducts to satisfy existing telecommunications demand, but with the intention to add optical fiber links at an indefinite future date as demand increase warrant.

It is therefore a principal object of the present invention to provide designs for optical cables for blow-in fiber installation which provide highly stable, low friction performance.

It is a further object of the invention to provide designs for optical cables for blow-in fiber installation which offer an improved combination of low friction against existing fiber coating materials with improved performance against existing fire codes.

It is a further object of the present invention to provide a combination of an optical fiber and plastic duct material which exhibits improved flame retardance.

Other objects and advantages of the invention will become apparent from the following description thereof.

SUMMARY OF THE INVENTION

The present invention provides optical cable and optical duct designs for such cable which incorporate improved polymer sidewall materials offering stable, low-friction performance for easy fiber installation and, in the preferred embodiments, good flame retardance characteristics as well.

In addition, the invention provides a novel combination of a coated optical fiber or fiber bundle and a plastic duct or an optical cable incorporating one or more plastic ducts, wherein the ducts loosely contain the coated fiber or fiber bundle and wherein the polymer material forming the sidewall of the duct or tube provides low friction against the coated optical fiber or bundle. The particularly preferred combinations also provide substantially improved resistance to flame propagation.

In the optical fiber/cable combination of the invention, the coated optical fiber or fiber bundle most preferably includes a textured plastic outer coating, composed for example of foamed polyvinyl chloride. Coatings of this type impart advantageous blow-in characteristics to the fiber or bundle, yet are frictionally compatible with the duct sidewall materials of the invention.

The cable conduit or tube provided in accordance with the invention has a side wall composition composed at least predominantly of polyvinyl chloride polymer, i.e., composed of at least about 50% of polyvinyl chloride by weight. The sidewall composition further comprises, as an additive to the polyvinyl chloride polymer, a finely dispersed fluoro-carbon polymer in a proportion of about 0.5-20% by weight of the sidewall polymer composition. Additional components of the side wall composition may include well known and conventional constituents of commercial PVC compounds, including plasticizers, stabilizers, flame retardants or the like.

The preferred fluorocarbon polymer is polytetrafluoroethylene. This polymer is compounded directly with PVC resins and other additives in a manner such that a fine dispersion of the fluorocarbon polymer in the PVC sidewall compound, discovered to be highly effective to significantly improve the friction performance of the sidewall, is achieved.

We have found that, by appropriately dispersing the fluorocarbon polymer in the polymer sidewall material at the time the polymers are first compounded to form the plastic compound for the duct tube or side wall thereof, substantial reductions in the coefficient of friction between the side wall and the coated optical fiber are realized. In addition, improved resistance to blooming and thus improved chemical and physical stability in the sidewall material are anticipated.

The optical cables comprising improved duct sidewall polymer materials in accordance with the invention may be adapted to contain one or a multiplicity of optical fibers. Thus the cable may consist of or include only a single duct for the installation of a single fiber or a small fiber bundle (a so-called "minicable"), or the cable may instead comprise multiple such ducts or tubes. In either case the ducts or tubes may consist of discrete tubing, or may be provided as bore channels in an extended polymer body or matrix.

The particularly preferred base polymers for the fiber duct materials to be provided in accordance with the invention are semi-rigid flame-retardant polyvinyl chloride compounds. For the purpose of the present description the term semi-rigid refers inter alia to plasticized PVC compounds with reduced plasticizer content. Through the use of polyvinyl chloride polymer sidewalls comprising fluorocarbon additives in accordance with the invention, very substantial reductions in the coefficient of friction between the coated fiber and duct, translating directly into greatly improved blowing distances for the optical fibers or cables, are achieved. In addition, the desirable blowing characteristics of the ducts are anticipated to be stable over longer periods than prior art duct materials.

Finally, the use of the preferred polyvinyl chloride polymer as the predominant component of the sidewall composition imparts a high degree of flame retardancy to the cable design. In contrast to polyethylene or similar polymers utilized in duct conduits for optical fiber installation, the polyvinyl chloride side wall materials of the invention, additionally containing the fluorocarbon polymer component compounded therewith, offer substantial reductions in both flame propagation rate and smoke emission when subjected to standard fire code tests.

DESCRIPTION OF THE DRAWING

The invention may be further understood by reference to the drawing wherein.

DETAILED DESCRIPTION

Figure 1A:
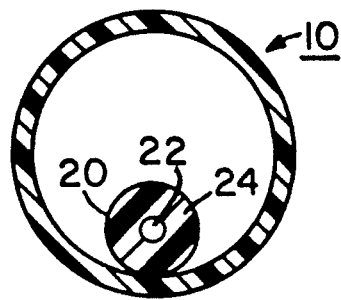
FIGS. 1a, 1b and 1c are schematic illustrations, in cross-section, of configurations for plastic ducts and optical fiber/cable combinations therewith which may be provided in accordance with the invention.

The use of polyvinyl chloride (PVC) materials as flame-retardant jacketing polymers is of course not new to the wire and cable industry. However, to our knowledge, these materials have not been utilized to provide tubes or ducts in optical cables.

One significant problem with these materials is that, with few exceptions, commercial PVC formulations tend to demonstrate strong frictional interactions with commercially coated blowable optical fibers, if the unmodified PVC formulations are used directly as microduct tubes. Hence, blowing distances over which optical fibers may be installed in commercial PVC tubing are in most cases quite negligible.

Among our findings is that some improvements in blowing distance can be achieved through the use of semi-rigid PVC formulations, e.g., PVC formulations in which the amount of plasticizer is reduced to achieve a harder material. However, even for the harder plasticized PVC compounds, blowing distances only on the order of 90 meters are obtained with some types of commercial fibers. These distances reflect measured coefficient of friction values on the order of 0.30, as measured between semi-rigid tubing and test fibers comprising foamed PVC coatings, although it is well recognized that such friction measurements are highly sensitive to test methods and other variables.

We presently consider that fiber blow distances of at least about 150 meters will be required in order to achieve significant levels of commercial utilization for blown fiber cabling systems. In accordance with the present invention, utilizing an appropriate blending procedure, additions of approximately 0.5-20% by weight of a fluorocarbon polymer such as polytetrafluoroethylene to a polyvinyl chloride base polymer have been found to significantly reduce the coefficient of friction of the base polymer against conventional optical fiber coating materials. More importantly, unexpectedly large increases in fiber blowing distances are achieved.

In an illustrative example, an addition of 5% by weight of polytetrafluoroethylene to a polyvinyl chloride polymer provided as the wall material for a microduct or tube can reduce the coefficient of friction value against PVC-foam-coated optical fiber as above described to a value of approximately 0.18. This improves blowing performance for the coated fiber to distances in excess of about 200 meters.

It is of course possible to include in the formulation for the polyvinyl chloride sidewall material additives in addition to the fluorocarbon polymer having desirable effects on duct or cable performance characteristics. Thus, for example, an antistatic agent may conventionally be included in the polymer to reduce the build up of static charges during fiber installation. Static charges can undesirably increase the forces inhibiting fiber transport through the microduct, thus reducing the distance over which the fiber can be installed. Carbon black is an example of a material with static dissipative properties which can be included in the tube wall if desired.

Figure 1B:
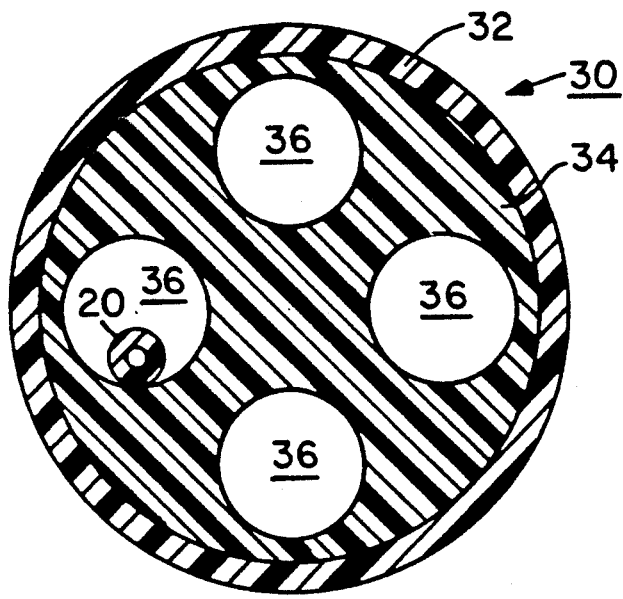
Figure 1C:
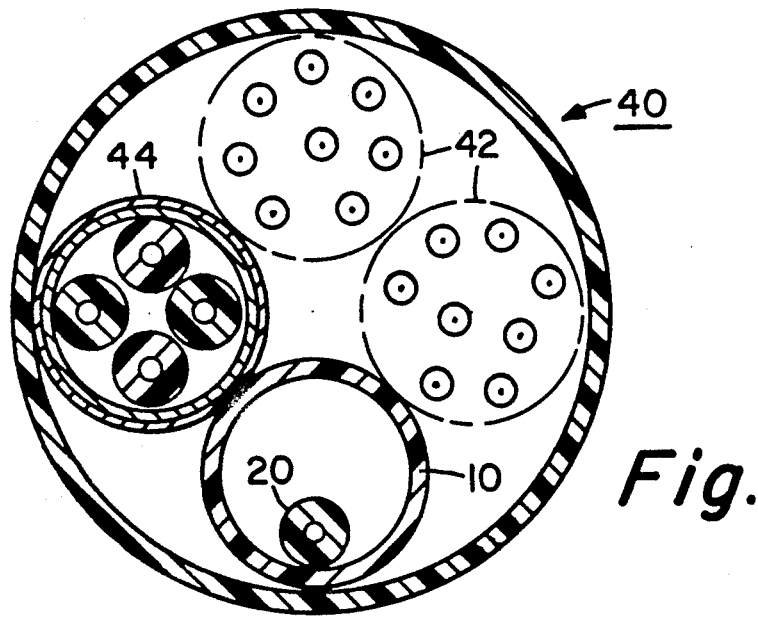

Examples of duct and/or optical cable designs provided in accordance with the invention are schematically illustrated in FIGS. 1a-1c of the drawing. FIG. 1a is a schematic illustration in cross-section, not in true proportion or to scale, of a small tubular plastic duct or so-called microduct 10 of a kind suitable for inclusion in an optical or conventional coaxial cable into which optical fibers are to be installed after cable installation.

Microduct 10 in FIG. 1a is formed of a PTFE-modified PVC compound, and contains within its bore a plastic-coated, blowable optical fiber 20 of known type. The optical fiber will typically comprise a glass optical fiber 22 supporting a plastic coating 24 for protection and enhanced blow-in performance. For best performance, the outer portion of plastic coating 24 is made of a textured or, most preferably, a foamed polymer such as a foamed polyvinyl chloride polymer.

One proposed design for an optical cable provided in accordance with the invention is shown schematically in FIG. 1b of the drawing. The optical cable 30 comprises an outer jacket 32 covering a core element 34 which is an extruded conduit or duct array incorporating multiple bores 36 forming microducts in the core. Core element 34 forming the sidewall material for microducts 36 is formed of PVC polymer comprising PTFE powder compounded therewith, and one of the microducts contains a blowable optical fiber 20 as in FIG. 1a. Of course an alternative design for an optical cable could simply comprise a jacketed bundle of microduct tubes of the kind illustrated in FIG. 1a.

Another proposed design for a communications cable is a hybrid cable including both copper wiring for voice and data communications and one or more optical fibers for optical telecommunications. FIG. 1c of the drawing is a schematic illustration, again not in true proportion or to scale, of a hybrid telecommunications cable 40. Included in cable 40, in addition to microduct 10 containing coated optical fiber 20, is a bundle 44 of copper wires for voice/data communications, as well as two groups of twisted copper wire pairs 42 for voice communications.

The type of polyvinyl chloride polymer utilized for the fabrication of the tube or microduct is not critical. Polyvinyl chloride tubing can be manufactured in various grades, ranging in flame retardance from a so-called plenum grade, suitable for use in cable types intended for horizontal installations such as for ceiling or floor wiring, to a so-called riser grade polymer suitable for use in cable types for floor-to-floor or other vertical installations. General grades of PVC not comprising flame retardant additives may also provide good blow-in performance for applications where such additives are not required.

As previously noted, while any of the commercial grades of PVC tubing will benefit from the incorporation therein of a PTFE additive, the use of PVC base polymers characterized as semi-rigid materials, typically polymers with lowered plasticizer contents, will normally be preferred.

The exact type of fluorocarbon polymer utilized as an additive for the selected sidewall polymer is likewise not critical, provided that the polymer is in a form which can be dispersed with the requisite degree of uniformity in a polyvinyl chloride base. Powders of polytetrafluoroethylene (PTFE), the preferred fluorocarbon polymer, are commercially available which provide an adequate feedstock material for the preparation of a suitable duct sidewall material for blown fiber installation. Examples of suitable materials include the Polymist ® F PTFE powders sold by Ausimont, Incorporated of Morristown, N.J. These powders are conventionally used as dry lubricants in applications where graphite or other lubricants are unsuitable, and/or as additives to inks, oils and greases to improve the lubricating and/or surface finish characteristics of these materials.

The addition of the selected fluorocarbon polymer to the polyvinyl chloride base polymer must, however, be properly performed in order to render the blended material useful for blown optical fiber applications. As will be evident to those skilled in the polymer arts, one can readily provide a blend of these two polymers by combining a commercially available polyvinyl chloride polymer in the form of a granular feed material with a polytetrafluoroethylene powder additive, applying conventional milling and blending procedures to produce a polyvinyl chloride/PTFE blend.

Unfortunately, a mixture prepared by this process is not considered useful for the production of duct materials for optical fiber installations because of the extensive agglomeration of the PTFE polymer which occurs in the polyvinyl base material. The frictional properties of PVC polymers produced by this method have been found to be inconsistent, and therefore the material is not likely to produce a duct material providing consistent blowing performance.

An operative and presently preferred approach for the production of useful modified polyvinyl chloride duct materials comprises compounding the PTFE directly with a selected polyvinyl chloride resin material as the polyvinyl chloride is first being manufactured from pure PVC polymer feedstock. This approach avoids agglomeration of the PTFE, such that the particle size of the PTFE is quite small and dispersion of this additive in the base polymer is uniform and complete.

Figure 2:
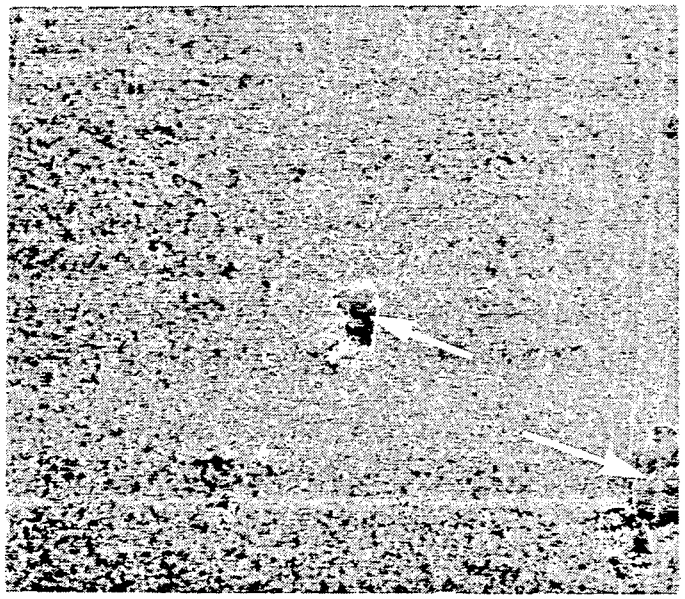
FIG. 2 is an electron photomicrograph showing the microstructure of a polyvinyl chloride duct compound made by mixing a powdered fluorocarbon polymer additive with a pelleted PVC compound.

The importance of blending procedure on polymer structure is more fully illustrated in the drawing. FIG. 2 of the drawing is an electron photomicrograph of a cross-section of a freshly compounded PVC duct sidewall material at a magnification of 50×. The sidewall material is composed of 95% by weight of polyvinyl chloride to which 5% by weight of PTFE powder has been added.

The process used to prepare the material shown in FIG. 2 comprised blending a commercially available PTFE powder with pellets of a commercial PVC compound, the latter consisting of PVC pellets sold by Cary Chemicals, Incorporated, Farmingdale, N.J. The arrows in FIG. 2 identify polymer agglomerates which have been determined by energy-dispersive x-ray spectrographic analysis to be fluorocarbon polymer agglomerates. These inclusions appear to be in the range of 50-100 μm in size.

Figure 3:
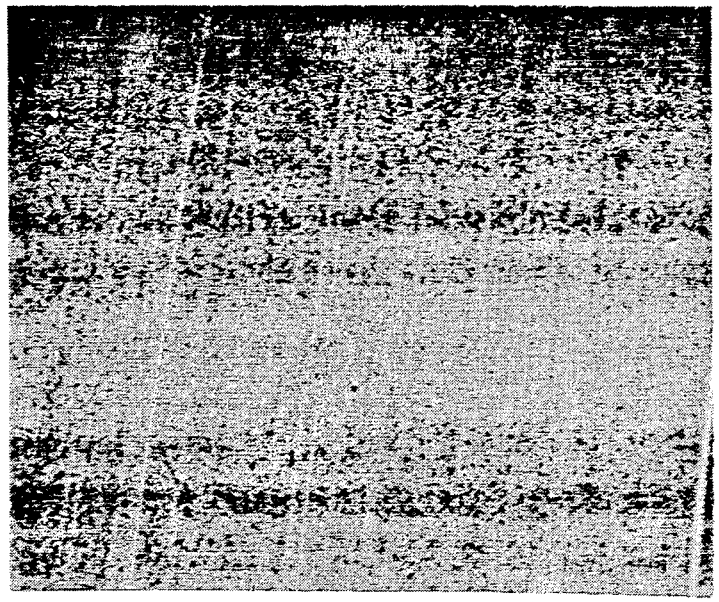
FIG. 3 is an electron photomicrograph showing the microstructure of a polyvinyl chloride duct compound made by introducing a fluorocarbon polymer additive during the PVC compounding process.

FIG. 3 of the drawing is an electron photomicrograph similar in format to the micrograph of FIG. 2, but in this case is a cross-section of a PVC/PTFE duct sidewall material prepared in accordance with the preferred process of the invention. Again the micrograph is taken at a magnification of 50×.

The material shown in FIG. 3 is of the same overall composition as the PTFE-modified PVC compound shown in FIG. 2. However, in the material of FIG. 3, the powdered PTFE polymer additive was introduced at the compounding stage, i.e., included directly with virgin PVC polymer feeds, plasticizers, flame retardants and stabilizing additives in the batch of constituents used to provide the modified PVC compound.

It is evident from a study of FIG. 3 that the PVC sidewall material provided in accordance with the invention contains no visible inclusions or agglomerations of PTFE. In fact, we believe that modified PVC polymers provided by direct compounding with PTFE in the manner of this material can be generally characterized as substantially free of discrete PTFE granules or domains larger than about 20 microns. As a consequence, these PVC/PTFE sidewall materials exhibit excellent and consistent low-friction behavior against conventional optical fiber materials, particularly including foamed PVC plastic fiber coatings.

As previously noted, the preferred duct material for use in accordance with the invention will consists at least predominantly (50% by weight or more) of plasticized polyvinyl chloride polymer. These polymers are well known in the art, typically comprising a homogenous blend of PVC resin (pure polymerized vinyl chloride) with one or more conventional plasticizers and other additives. The plasticizers are generally di- or tri-alkyl pthalates, alkyl trimellitates, alkyl adipates, epoxidized esters such as epoxidized linseed oil, alkyl phosphates and alkyl stearates. The plasticizers may constitute 20-40% or more of the plasticized PVC polymer, with the remainder comprising the vinyl chloride polymer itself, together with minor additions of light stabilizers, flame retardants, and other modifiers.

The compounding of a polyvinyl chloride polymer comprising a PTFE addition to render the PVC suitable for use as a fiber duct material in accordance with the invention can follow conventional PVC compounding procedures well known in the art. The following hypothetical example provides an illustration such a procedure.

EXAMPLE 1

Fiber Duct Fabrication

A feed material for the extrusion of a PTFE-modified polyvinyl chloride microduct tube may be prepared from conventional batch materials as follows. One hundred parts by weight of a powdered polyvinyl resin, commercially available as Geon® 102 EP PVC from the B. F. Goodrich Company, Chemical Group, Cleveland, Ohio, is mixed with 8 parts by weight of a commercial PTFE powder. The PTFE powder is Polymist F-5 powder from Ausimont, Incorporated of Morristown, N.J, having a specific gravity of 2.28 and an average particle size below about 10 μm.

To this powder mixture are added 25 parts by weight of a conventional plasticizer, most preferably one or a mixture of trialkyl trimellitate plasticizers. Also added are 3 parts by weight of an epoxidized ester plasticizer, 0.5 parts stearic acid, and 3.25 parts total of uv absorbers and stabilizers. Up to 3 parts by weight of one or more flame retardants such as antimony oxides, alumina trihydrate or the like may also be included for improved flame resistance.

The ingredients thus combined are first dry-blended in a ribbon mixer using moderate heat until the powder constituents are well mixed and dry in appearance. The batch is then transferred to a high shear mixer, i.e., an extruder, is then fused in the extruder and extruded as sheet, and is finally cooled and pelletized to provide a stable PTFE-modified polyvinyl chloride feedstock.

The modified PVC feedstock thus provided may thereafter be reprocessed by extrusion into a cylindrical tube or microduct of dimensions suitable for the blow-in installation of optical fibers. Microducts with walls of 0.03-0.06 inches thickness and outer diameters of 0.25-0.50 inches are quite suitable for use, for example, where single plastic-coated optical fibers or bundles or groups of 2-8 optical fibers are to be installed.

The performance characteristics of ducts provided in accordance with the invention for the blow-in installation of optical fibers is more fully illustrated by the following example.

EXAMPLE 2

Blow-In Fiber Installation

A plastic microduct of 0.25 inches outer diameter and 0.030 inches wall thickness is provided. This microduct, having a composition of about 95% of flame retardant plasticized polyvinyl chloride polymer and 5% PTFE polymer, is extruded from a PVC compound prepared by Cary Chemicals, Incorporated. It is similar in composition to Cary 1690-1011 flame-retardant PVC, but with plasticizer levels reduced by about 50% and with the added PTFE powder. The custom compounded material thus provided is substantially free of PTFE agglomerates.

The microduct thus provided is installed horizontally in a ceiling installation such that the duct traverses six 90° bends of six-inch radius over each 150 meters of duct traverse length. Four coated optical fibers are then selected for installation in the microduct. The optical fibers are 125 $\mu$m diameter low-loss glass optical fibers provided with uv-cured acrylate protective coatings covered by foamed polyvinyl chloride outer jackets to enhance the blow-in characteristics of the fibers. The outer diameter of each of the coated optical fibers is 700 $\mu$m.

The optical fibers are inserted as a loose fiber group into the microduct and compressed air is forced past the fibers and through the duct as the fibers are fed into the duct inlet. Air pressures used are in the range of 10-102 psi, although higher pressures can be used if desired.

Blow-in distances for the fiber group under these conditions is determined by a cut-back method wherein a very long initial length of the microduct is first tried. The duct length is then successively shortened, after each installation run, until successful installation of the fiber bundle is achieved. Using this method, the measured blow-in distance for the described fiber bundle is approximately 220 meters, representing a very substantial increase over the blow-in distances attained under identical installation conditions utilizing unmodified PVC microducts.

EXAMPLE 3

Blow-In Fiber Installation

The microduct extrusion procedure of Example 2 is repeated to produce a blow-in duct of identical configuration, except that the compound used for the extrusion of the microduct is one comprising 10% by weight of PTFE in the formulation. As in Example 2, the compound thus provided is substantially free of PTFE agglomerations.

Blow-in installation into the duct is attempted using a 4-fiber group of PVC-foam-coated fibers as in Example 2. Utilizing the cut-back method for determining blow-in distance, installation into 260 meters of the microduct is successfully achieved. Thus the use of somewhat greater PTFE concentrations can achieve useful increases in blowing distance, the largest measure of improvement, insofar as coefficient of friction data are concerned, is obtained at PTFE concentrations in the 1-8% PTFE content range.

EXAMPLE 4

Flame Propagation Test

Several lengths of hybrid telecommunications cable comprising both shielded and twisted pair copper wiring into which single microducts of the PTFE-modified polyvinyl chloride microduct described in Example 2 had been installed were subjected to flame spread testing. The test was designed to determine the suitability of the modified cable for ceiling or sub-floor installations. The cable used in the flame tests had a configuration similar to that shown in FIG. 1c of the drawing.

The PVC compound used to fabricate the ducts included 5% by weight of PTFE in the formulation. The microduct dimensions were the same as for Examples 2 and 3 above.

The flame propagation test employed in testing the cable followed Underwriters Laboratories test UL 910 for plenum cable installations. Among other requirements, that test specifies a flame propagation distance of less than five feet, a peak smoke optical density of less than 0.5, and an average smoke optical density of 0.15 under precisely controlled burning conditions.

Preliminary flame test screening of two cable samples indicated high smoke density. However a subsequent testing of three cable samples under strict (Underwriters Laboratories) testing procedures, one sample being tested with the microduct empty and the other two samples with four fibers installed, resulted in all three cable samples meeting all of the above test criteria. Both flame spread and smoke emission requirements were met.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A telecommunications cable comprising at least one plastic duct adapted for the blow-in installation of one or more coated low-loss optical fibers, wherein at least the inner sidewall of the duct consists predominantly of polyvinyl chloride polymer which comprises 0.5-20% by weight of a fluorocarbon polymer.

2. A telecommunications cable in accordance with claim 1 wherein the plastic duct is an extruded plastic tube composed predominantly of polyvinyl chloride and containing 0.5-20% by weight of polytetrafluoroethylene.

3. A telecommunications cable in accordance with claim 2 wherein the plastic tube contains 1-8 low-loss glass optical fibers.

4. A telecommunications cable in accordance with claim 2 which comprises, in combination with the plastic tube, one or more copper wires for the transmission of electrical voice or data telecommunication signals.

5. A telecommunications cable in accordance with claim 3 wherein at least one of the low-loss optical fibers comprises an outer plastic coating of foamed polyvinyl chloride.

6. A plastic duct for the containment of one or more coated optical fibers, the duct having an inner sidewall composition consisting predominantly of polyvinyl chloride polymer and containing 0.5-20% by weight of a fluorocarbon polymer.

7. A plastic duct in accordance with claim 6 which is an extruded plastic tube composed at least predominantly of polyvinyl chloride polymer and containing 0.5-20% by weight of polytetrafluoroethylene.

8. A plastic duct in accordance with claim 6 wherein the inner sidewall is provided as a layer of a polyvinyl chloride compound containing 0.5-20% by weight of a fluorocarbon polymer.

9. In combination, a plastic duct having an inner sidewall composition consisting predominantly of polyvinyl chloride polymer with at least one optical fiber or cable disposed in loose containment within the duct, wherein the inner sidewall composition includes 0.5-20% by weight of a fluorocarbon polymer and the optical fiber or cable comprises a textured plastic outer coating.

10. The combination of claim 9 wherein the textured plastic coating is composed of foamed polyvinyl chloride.

* * * * *